Feb. 16, 1926. 1,573,019
A. M. RUTTER ET AL
BEARING SCRAPING AND BURNISHING TOOL
Filed May 18, 1922  3 Sheets-Sheet 3

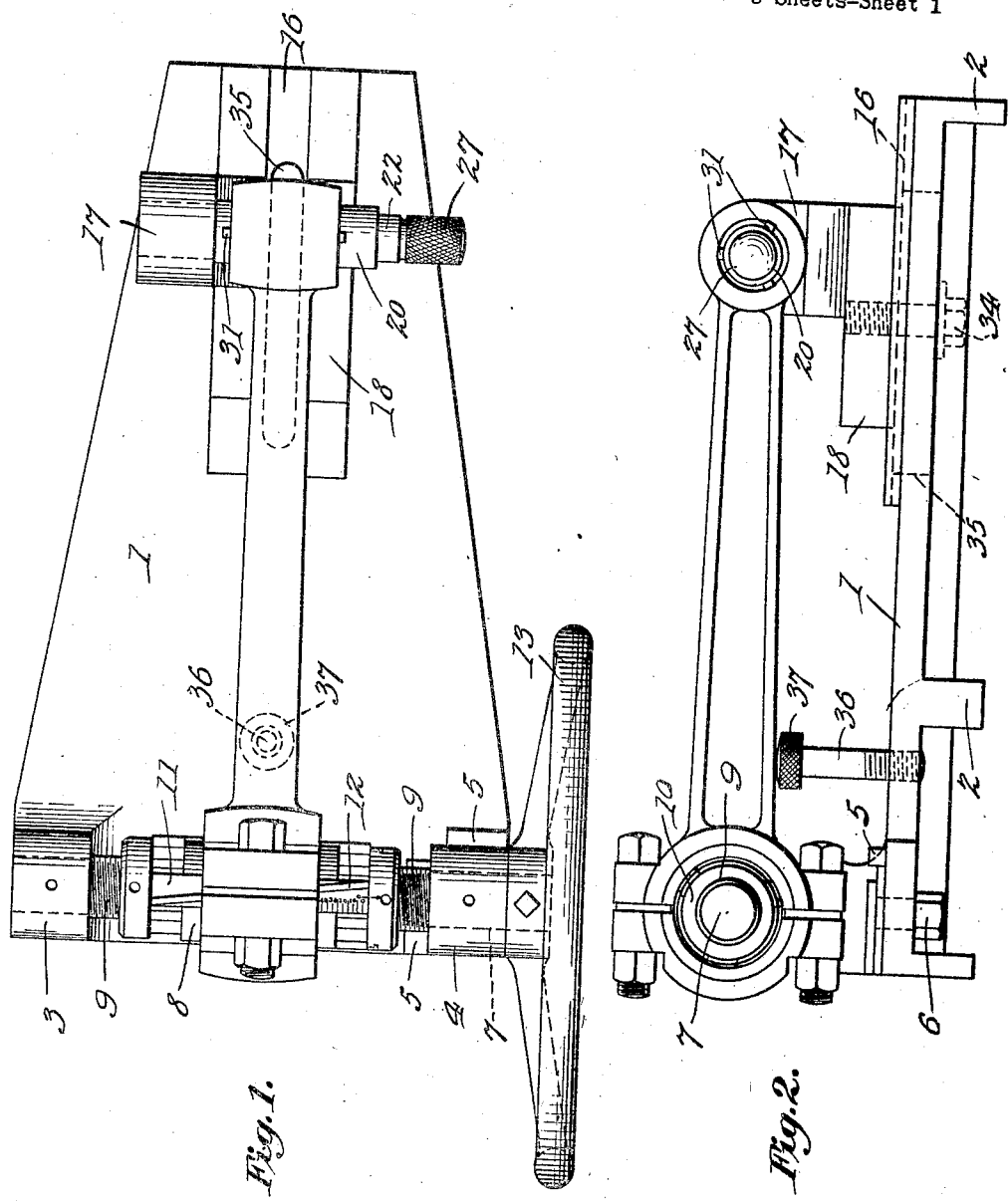

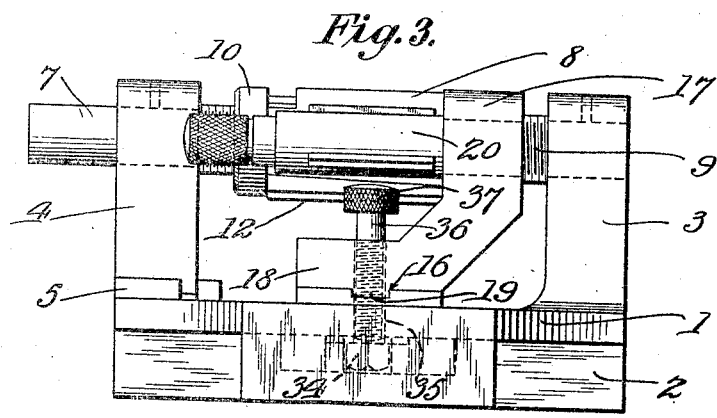
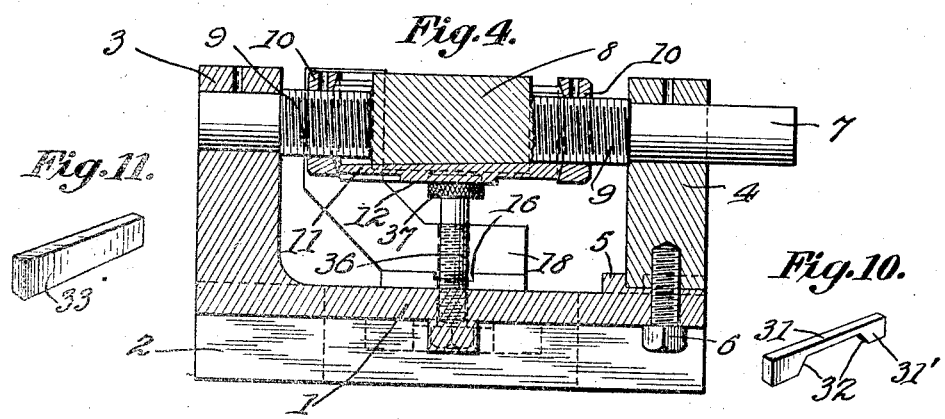
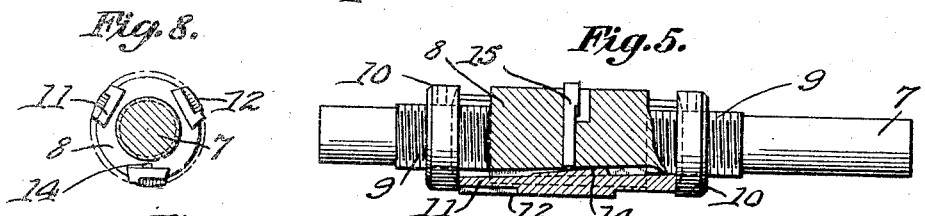
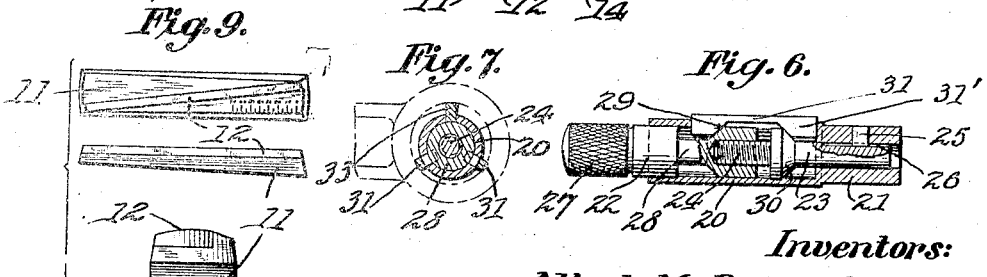

Inventors
Albert M.Rutter and
Clarence R.Benson by Spear, Middleton Donaldson Spear
Attorneys Patented Feb. 16, 1926.

1,573,019

UNITED STATES PATENT OFFICE.

ALBERT M. RUTTER AND CLARENCE R. BENSON, OF BALTIMORE, MARYLAND.

BEARING SCRAPING AND BURNISHING TOOL.

Application filed May 18, 1922. Serial No. 561,963.

*To all whom it may concern:*

Be it known that we, ALBERT M. RUTTER and CLARENCE R. BENSON, citizens of the United States, and residents of Baltimore, in the county of Baltimore, in the State of Maryland, have invented certain new and useful Improvements in Bearing Scraping and Burnishing Tools, of which the following is a specification.

This invention relates to devices for scraping and burnishing surfaces of a cylindrical nature, more particularly to such a surface as found in a connecting rod bearing.

It has long been recognized in this art that it is extremely difficult to secure a bearing surface in a connecting rod without high spots and if a surface is to be obtained without these defects it entails a great deal of labor and time. Again, it is a most difficult problem to have the crank pin bearing surface absolutely parallel with the piston pin bearing surface in a connecting rod. In the usual practice these two surfaces are scraped or burnished independently of each other and while said surfaces may be obtained in each bearing, unless they are absolutely parallel with each other, uneven wear and tear will result with accompanying undue friction faulty lubrication and the like.

The primary object of our invention is to provide a device which may be of a simple construction without complicated parts, which will be cheap to manufacture and will be within the financial grasp of the ordinary repair shop taking care of such work.

Another object of our invention is to combine a scraping tool and a burnishing tool into one device which by simple adjustment may be made to accommodate connecting rods having bearings of various sizes.

Still another object is to provide a device which will instantly check up the parallelism of the crank and wrist pin bearing surfaces to determine any twists or bends in the connecting rod proper. Another and important object is to provide a device in which a roughly straightened connecting rod may have a new bearing surface scraped and burnished therein in absolute parallelism to the other surface.

These and other objects we secure by the use of certain instrumentalities and we have illustrated a preferred construction and combination of parts in the accompanying drawings, although obviously, various changes will occur to those skilled in this art and still fall within the scope of the claims.

In the illustration of the principle involved as shown in the drawings—

Figure 1 is a plan view of one embodiment of our invention.

Fig. 2 is a side elevation of Fig. 1.

Fig. 3 is an end elevation of Fig. 1 with the connecting rod removed.

Fig. 4 is an end elevation showing the blade carrier in longitudinal section and looking in the reverse direction to Fig. 3.

Fig. 5 is a sectional view of a modified blade carrier assembly.

Fig. 6 is a detail of the wrist pin bearing expanding gripper.

Fig. 7 is a sectional view of Fig. 6.

Fig. 8 is a detail of the blade assembly.

Fig. 9 is a detail of one form of blade.

Figs. 10 and 11 are details of two forms of expanding members for the wrist pin bearing.

Figure 12:
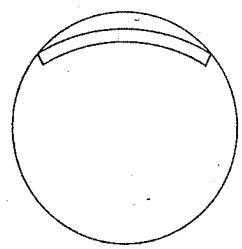
Figs. 12, 13 and 14 show diagrammatically various positions of the blades in the operation of cutting and burnishing.

Our invention consists essentially in providing a rotatable scraping and burnishing tool adjustable to various diameters upon which one of the bearing surfaces of a connecting rod is adapted to contact. An expanding fixture adapted to be inserted within and to grip the other bearing surface of the connecting rod, is suitably held upon a member which is slidable within a slot at right angles to the rotatable scraper axis in such a manner as to insure parallelism of the axes of the bearing surfaces. The rotatable scraper may now be actuated either manually or by power means after having been adjusted to the desired diameter of the finished bearing aperture.

Referring now more particularly to the preferred embodiment, we have shown a bed at 1 having downwardly projecting ribs 2 adapted to support the device upon a table, bench or the like, or which may be gripped in a vise to more securely hold the assembly in a rigid manner. Upstanding journal posts 3 and 4 are provided at one end of the bed, the latter abutting projections 5 and being secured to the bed by means of bolt 6 passing through the bed and into the bottom of this journal post. The projections 5 are spaced from each other at one corner of the post in order to facilitate machining. A blade carrier 7 having plain ends adapted to journal in posts 3 and 4 is provided with a central enlargement 8, having therein longitudinally disposed dove-tailed slots of a depth decreasing toward the integral journal posts. While this particular arrangement is illustrated, obviously a re-arrangement would effectually serve the purpose.

Intermediate the enlarged portion 8 and the plain ends, we provide a threaded portion 9 adapted to receive a similarly threaded nut 10 which may be either knurled, hexagonal or provided with spanner depressions to facilitate rotation thereof. The face of the nut 10 nearer the enlarged portion 8 of the blade carrier is preferably of a frusto-conical shape for a purpose more fully hereinafter described. Insertable within the longitudinally dove-tailed slots of the blade carrier are a plurality of scraping and burnishing blades such as illustrated, having a base 11 and an upstanding cutting portion 12 extending diagonally thereof. The sides of the base portion 11 are dove-tailed in a like manner as the blade slots, the extremities of said base being a portion of a frusto-conical surface in order to abut the frusto-conical base of the nut 10. The extreme top surface of the cutting portion 12 is a portion of a cylindrical surface the diameter of which is the diameter of the largest cylindrical surface with which the cutting edge of the blade will contact. The reason for this will be more fully hereinafter described.

The base 11 of each blade is of a thickness corresponding to the depth of the slots in order to maintain the cutting portion 12 of the blade parallel with the axis of the blade carrier. We have shown the carrier as accommodating three such blades, but this obviously may be varied according to conditions. It will now be apparent that by rotation of the nut 10 longitudinal movement will be transmitted to the blade by reason of the abutment of the end thereof with the frusto-conical face of the nut. This movement causes the over-all diameter of the enlarged portion 8 of the blade carrier plus the blade, to increase, due to the varying depth of the slot and the similar thickness of the blade. It will also be apparent that the rotation of the nut 10 will uniformly advance the several blades, thus insuring the coincidence of each blade surface in the same cylindrical surface.

It may be found desirable to indicate certain micrometer graduations upon the nut and the blade with zero points on these two members and upon an adjacent part of the enlarged portion 8 of the blade carrier. It will thus be evident that rotation of the nut 10 will cause longitudinal movement of the blade 11. As the blade disappears beneath the large bearing of the connecting rod, the micrometer marks will also disappear. In other words, the diameter of the bearing may be readily determined by reading the first micrometer mark visible from the bearing side. The zero mark on the nut 10 is merely for the purpose of determining when a rotation of the nut has been completed. The scraping surface may or may not extend the entire length of the base 11, as desired, but it has been found more satisfactory to have this surface of an extent greater than the width of the ordinary connecting rod bearings in order to accommodate surfaces of varying widths.

A hand wheel 13 may be secured to one end of the blade carrier to facilitate rotation of the same, and obviously, if found desirable, power means may be applied to rotate the scraper assembly.

It may be in some instances desirable to supply micrometer graduations upon the nut and blade, and inasmuch as it is impossible with an odd number of blades to determine the exact diameter of the scraping surface, by means of calipers, we have illustrated a modification of a blade and other instrumentalities by which caliper readings may be secured. This consists in providing a blade having the usual base 11 and the cutting surface 12, but having at the lower part of the base a built up projection 14 having a surface inclined to the axis of the blade carrier equal to twice the inclination of the bottom surface of the base of the blade. An aperture perpendicular to the axis of the blade carrier is provided therein adapted to receive a pin 15 of a length equal to the radius of the largest cylindrical surface which the scrapers describe in rotation. It will now be seen that the thickness of the blade plus the length of the pin will at all times equal the circle described by any point in the blade in rotation. This is due to the fact that the built up projection 14 is of an inclination twice that of the lower surface of the base 11 of the blade. This second amount of inclination similar to that of the normal blade, produces in effect a second blade diagonally opposed to the normal blade and allows a caliper reading to be secured. As the blade is advanced by rotation of the screw 10, the pin is correspondingly projected outwardly an amount equal to the normal thickness of the blade at the point of contact with the pin, plus the increase in thickness of the imaginary blade diameter opposite.

At the opposite end of the bed 1 and preferably at a point midway of the blade 12, but in all cases at right angles to the axis of the blade carrier, we provide a slot 16 of an extent sufficient to accommodate connecting rods of various lengths. A member having a vertical portion 17 and a horizontal portion 18 is provided, the horizontal portion having a projection 19 adapted to ride in the slot 16. The vertical portion 17 of this member is provided with an aperture, in this case cylindrical, the axis of which is perpendicular to the sides of the slot 16, which necessitates parallelism between the axis of this aperture and the axis of the blade carrier.

A surface gripping member having a casing 20 terminating into a plain cylindrical portion 21 insertable within the aperture in the vertical portion 17, is provided with telescoping parts 22 and 23 threaded together as at 24. The portion 21 is provided with a pin 25 engaging the member 23 in a longitudinal slot 26 in a manner to prevent rotation of the part 23 and yet allow axial movement thereof. The extreme end of the member 22 may be knurled as at 27 to facilitate rotation.

The member 22 is provided with a portion 28 having a reduced diameter, said portion increasing in its diameter to the full diameter of the part 22 thereby forming a frusto-conical surface 29. Member 23 is likewise provided with a frusto-conical surface 30, the members 22 and 23 engaging each other in a threaded manner as above described yet allowing axial movement between the parts.

The case 20 is longitudinally slotted, preferably in three places to receive the clamping element 31 having enlarged ends 31', the reduced center increasing in thickness to the full width of the ends to form a frusto-conical surface 32. The surfaces 32 of this part are adapted to engage the surfaces 29 and 30 of the telescoping parts which upon rotation of the knurled handle 27 causing a separation of parts 22 and 23, will cause the clamping member to ride up out of its slot, due to the wedging action of the frusto-conical surfaces, thus a cylindrical surface, such as the wrist pin aperture of a connecting rod, being inserted over the assembly. By rotation of the knurled handle 27 the clamping members will expand and securely clamp the connecting rod at the point. If desired, a rectangular block 33 may be substituted for two of clamping members where the wrist pin aperture is of an excessive size, the third clamping member giving the desired expansion and allowing the parts to readily contact.

The horizontal portion 18 of the wrist pin aperture clamping member holder is provided with a threaded aperture adapted to receive a bolt 34 insertable through an aperture 35 in the bed, engaging the part 18 to securely position the same.

A bolt 36 having a knurled head 37, is adapted to engage the bed 1 in a threaded manner to aid as a support for a connecting rod which is being scraped.

The operation of the device is as follows:

The bearing cap of the connecting rod in which the surfaces are to be scraped and burnished is removed, this portion of the connecting rod made to encircle the blade assembly, the desired finished diameter of the bearing determined by adjustment of the nut 10 and the connecting rod cap placed in position. The wrist pin of the connecting rod is now placed upon the expanding clamper, the knurled handle 27 rotated until the connecting rod is securely held thereby, the assembly inserted within the aperture in the vertical part 17 and the projection 19 placed in the slot 16. The connecting rod is then adjusted longitudinally of the bed until the crank pin bearing surface engages the scraping blades as near as possible and the cap joint bolted on. The hand wheel 13 may now be rotated in either direction, the excess metal at any point in the crank pin surface being scraped until the desired diameter is reached.

Figure 13:
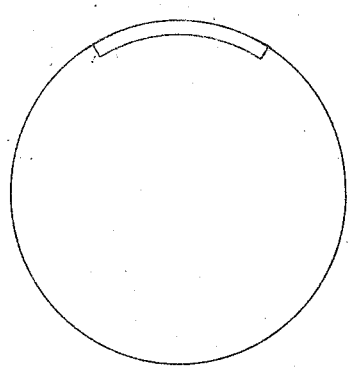
Figure 14:
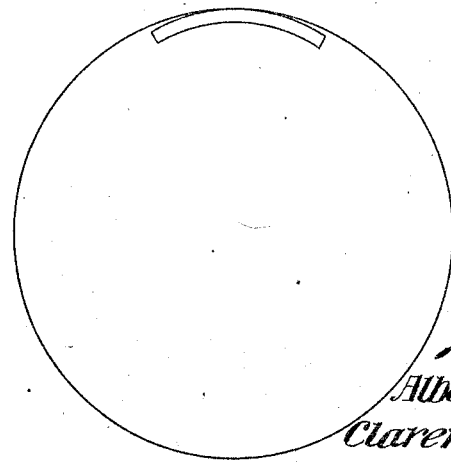

If the diameter of the blade were equal to the diameter of the member to be scraped, there would be no scraping action. Because the diameter of the surface of the blade is greater than the diameter of the part being scraped, the blade is caused to engage the bearing surface and remove a portion thereof, until the diameters are equal. Further advancement of the blade onto the bearing tends to increase the diameter of the path described in the rotation of the cutting member. This is clearly shown in Figs. 12, 13 and 14, in which the parts are exaggerated in order to make the point clear. It will be apparent that the scraper blade in all three figures, has the same imaginary diameter. At the beginning of operations illustrated in Fig. 12, the diameter of the bearing being scraped must of necessity be less than the imaginary diameter of the blade, otherwise the edge will not engage. Upon rotation of the scraper blade from the position of Fig. 12, a point will be reached when sufficient metal has been removed from the inner surface of the bearing and the parts will assume the relationship shown in Fig. 13, that is, the cutting edge of the blade no longer functions, but the scraper blade simply rotates within the bearing. Further longitudinal movement of the blade, that is in a plane perpendicular to the plane of the drawing, will tend to compress the metal of the bearing, which is not impossible, inasmuch as the bearings are usually of a softer composition and the scraper blade of hardened steel. Upon rotation of the blade from this position, and continued longitudinal movement, the parts assume the relationship of Fig. 14, that is, the cutting edge of the blade has actually left the surface of the bearing, and the top or ridge of the scraper blade burnishes the inner surface of the bearing. It will thus be seen that due to the right angular relation between the expanding clamping member and the slot within which the carrier rides, that parallelism between the axes of the wrist pin bearing and the crank pin bearing is maintained at all times.

If the crank pin bearing is first made fast to the scraper assembly, the wrist pin clamper member then inserted within the wrist pin aperture, the clamper inserted within its carrier and the carrier falls naturally within slot 16, it is evident that the web of the connecting rod is substantially straight. If, however, in this procedure the projection 19 will not seat in the slot 16, it is now evident that the connecting rod is either bent or twisted and a necessary remedy must needs be applied.

In the commercial construction of this article, various sets of blades to suit different diameters required, may be provided, as obviously there is no limit to the minimum and maximum adjustment of blades.

The slot 35 allows the device to be adjusted to various lengths of connecting rods the expanding clamper member to various diameters of wrist pin apertures and the various sets of blades to different diameters of wrist pin bearings. It will thus be seen that a most flexible adaptation is secured by the use of these instrumentalities.

It will be apparent that it is impossible to scrape a bearing beyond the diameter set, inasmuch as beyond this point the scraping portion of the blades no longer contacts with the bearing surface, but the scraper becomes a burnishing tool. This insures a uniform surface with the maximum amount of wrist pin contact, which is greatly desirable. It will be noted that the blade 12 is on a sufficient angularity in relation to the axis of the carrier as to close the joint between the cap and the connecting rod, which insures an even scraping action on each side of the joint.

What is claimed is:—

1. A device of the character described including scraping means, said scraping means including a rotatable member carrying a longitudinally movable blade, said rotatable means having a pin radially disposed therein in contact with said blade.

2. A device of the character described including scraping means, said scraping means including a rotatable member carrying a longitudinally movable blade, said blade having a projection thereon forming an angular face.

3. A device of the character described including scraping means, said scraping means including a rotatable member carrying a longitudinally movable blade and means to move said blade in relation to said rotatable member, and means upon said blade moving member and said blade to indicate the amount of movement of said blade.

4. A device of the character described, including a rotatable scraper, a base carrying bearing posts upon which said scraper is journaled, one of said posts being removable.

5. The device of claim 4, having lugs upon said base adapted to position said removable bearing post, said lugs being separated.

6. A device of the character described, including a rotatable member, a blade carried thereby, the surface of said blade being a portion of a cylindrical surface of a diameter larger than the diameter of the member to be scraped.

In testimony whereof, we affix our signatures.

ALBERT M. RUTTER.
CLARENCE R. BENSON.